United States Patent [19]

Butler et al.

[11] Patent Number: 4,654,654

[45] Date of Patent: Mar. 31, 1987

[54] DATA NETWORK ACKNOWLEDGEMENT ARRANGEMENT

[75] Inventors: Thomas T. Butler, Downers Grove; Wayne V. Lindquist, North Aurora, both of Ill.; Priscilla M. Lu, Holmdel, N.J.

[73] Assignee: AT&T Bell Laboratories, Murray Hill, N.J.

[21] Appl. No.: 846,478

[22] Filed: Mar. 31, 1986

Related U.S. Application Data

[63] Continuation of Ser. No. 464,383, Feb. 7, 1983, abandoned.

[51] Int. Cl.$^{4}$ .............. H04Q 1/00

[52] U.S. Cl. .............. 340/825.5; 340/825.52; 370/85

[58] Field of Search .............. 340/825.5–825.53; 364/200; 179/179.20 R, 175.20 C, 175.30 R; 370/85, 60, 91–94; 371/48

[56] References Cited

U.S. PATENT DOCUMENTS

| | | | |
|---|---|---|---|
| 3,715,725 | 2/1973 | Kievit et al. | 340/825.53 |
| 4,063,220 | 12/1977 | Metcalfe et al. | 340/174 LP |
| 4,167,786 | 9/1979 | Miller et al. | 340/825.52 X |
| 4,282,512 | 8/1981 | Boggs et al. | 340/825.5 |
| 4,292,623 | 9/1981 | Eswaran et al. | 340/825.5 |
| 4,354,263 | 10/1982 | Bordry et al. | 370/94 |
| 4,408,323 | 10/1983 | Montgomery | 370/60 |
| 4,430,651 | 2/1984 | Bryant et al. | 340/825.52 |
| 4,447,871 | 5/1984 | Terada et al. | 364/200 |

OTHER PUBLICATIONS

Douglas Lewin, *Theory and Design of Digital Computer Systems,* (New York: Halsted Press, Div. of John Wiley & Sons, Second edition, 1980), pp. 455–456.

Intel Component Data Catalog, (Intel Corporation, Jan. 1982), pp. 9-191-9-215.

R. M. Metcalfe and D. R. Boggs, "Ethernet TM: Distributed Packet Switching for Local Computer Networks," *Local Computer Networks,* 2nd ed., IEEE Computer Society Press, 1981, pp. 262–271.

M. Tokoro and K. Tamaru, "Acknowledging Ethernet," *Local Computer Networks,* 2nd ed., IEEE Computer Society Press, 1981, pp. 285–290.

R. V. Mockapetris, M. R. Lyle, and D. J. Farber, *Design of Network Access Arrangements,* University of California, Irvine, Department of Computer Science, UCI Technical Report 95, Nov., 1976.

K. J. Thurber and H. A. Freeman, "Architecture Considerations for Local Computer Networks," *Local Computer Networks,* 2nd ed., IEEE Computer Society Press, 1981, pp. 4–15.

D. D. Clark, K. T. Program, and D. P. Reed, "An Introduction to Local Area Networks," *Local Computer Networks,* 2nd ed., IEEE Computer Society Press, 1981, pp. 16–36.

K. Lin, "Design of a Packet-Switched Micro-Subnetwork," *Local Computer Networks,* 2nd ed., IEEE Computer Science Press, 1981, pp. 95–104.

C. Bass, J. S. Kennedy, and J. M. Davidson, "Local Network Gives New Flexibility to Distributed Processing," *Local Computer Networks,* 2nd ed., IEEE Computer Society Press, 1981, pp. 358–366.

*Primary Examiner*—Ulysses Weldon
*Attorney, Agent, or Firm*—Werner Ulrich; Peter Visserman

[57] ABSTRACT

A method and apparatus for flexibly interconnecting the nodes of a local data network to achieve reliable internodal data transmission while minimizing the extra data processing load on the host processors of each node. An interface processor is provided at each node which controls transmission and reception of data packets and the communication of data from and to the location in node storage associated with the program processes which generate and receive the data. Different protocols are provided for different types of messages and are controlled by the interface processor in order to provide high reliability data transmission where needed. Destination addresses are associated with each data packet to provide flexible routing of data.

8 Claims, 13 Drawing Figures

| | | |
|---|---|---|
| 221 | 0 0 0 0 0 0 0 0 | BROADCAST |
| 222 | 0 0 0 0 0 0 0 1<br>•<br>•<br>•<br>f f f e f f f f | OTHER LOGICAL CHANNELS |
| 223 | f f f f 0 0 0 0<br>•<br>•<br>•<br>f f f f f f f e | PHYSICAL ADDRESSES |
| 224 | f f f f f f f f | ILLEGAL |

390

| | SEARCH FUNCTION | RESPONSE | |
|---|---|---|---|
| 391 | BROADCAST ADDRESS | 0 | 392 |
| 393 | PHYSICAL ADDRESS | 1 | |
| 395 | DESTINATION ADDRESS | 2 | |
| | •<br>•<br>•<br>•<br>•<br>•<br>•<br>• | •<br>•<br>•<br>•<br>•<br>•<br>•<br>• | |
| 397 | DESTINATION ADDRESS | 63 | |

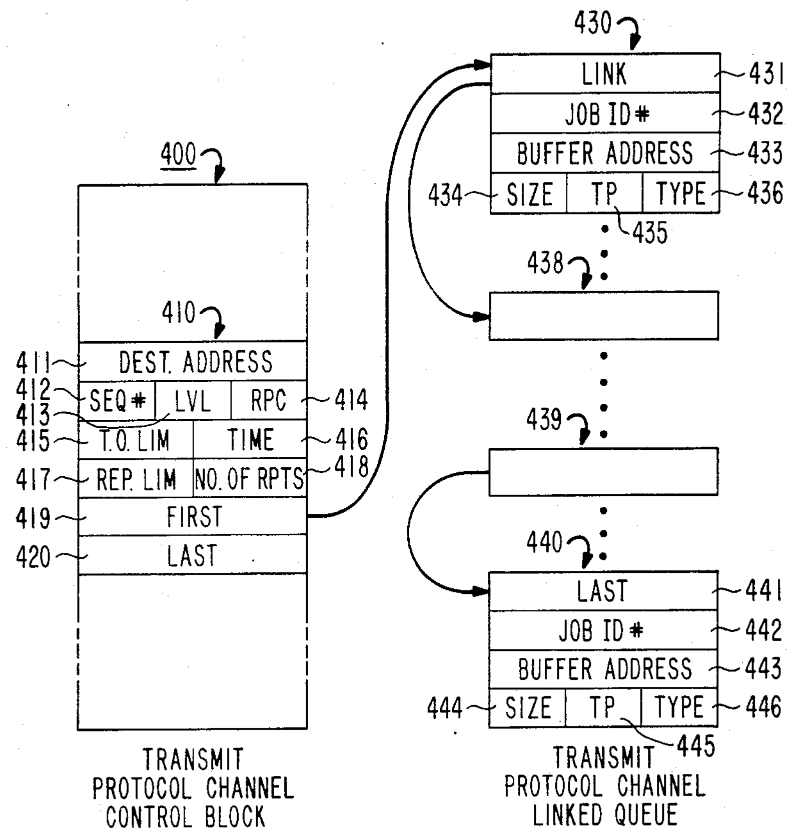
FIG. 11
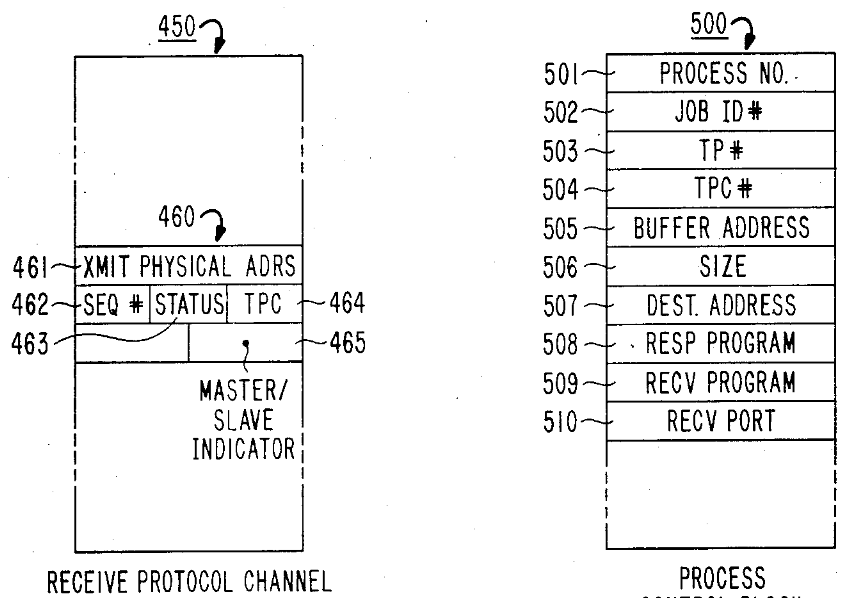
FIG. 12
FIG. 13

DATA NETWORK ACKNOWLEDGEMENT ARRANGEMENT

CROSS-REFERENCE TO RELATED APPLICATIONS

This application is a continuation of application Ser. No. 464,383, filed Feb. 7, 1983 now abandoned.

TECHNICAL FIELD

This invention relates to a data communication network for use in a distributed data processing or data switching system, and more specifically, to a method and apparatus for flexibly interconnecting data sources and destinations in a local data communications system.

BACKGROUND OF THE INVENTION

Many larger modern data processing and data switching systems are distributed processing systems consisting of a number of physically separated data processing or data switching facilities. These data processing or data switching facilities are frequently interconnected in a local data network. In a local data network, the data processing or data switching facilities are located within individual entities or nodes which are connected to a common transmission or data network medium such as a coaxial cable. Facilities located within different nodes communicate by transmitting data messages, usually in the form of limited length packets of data, over the medium.

A local data network is frequently used in systems having a moderate community of data processing interest among the interconnected data processing or data switching host processors (main frames) at each node and requiring the flexible exchange of a substantial quantity of data among these host processors. Networks of such systems frequently require flexible message interconnection arrangements in which some messages must be sent to several nodes. In order to handle this requirement, some prior art systems have used destination addressing to route packets of data. Here, each packet contains a destination address and each node is prepared to examine every packet to see if the destination address matches one of the addresses of packets that are received by that node. This capability permits a single message to be received by one or a set of nodes. Local data networks including this type of facility are described in D. D. Clark et al.: An Introduction to Local Area Networks, Proceedings of the IEEE, V. 67, No. 11, pp. 1497–1517, November, 1978.

In a local data network, each of the host processors in a node is normally executing one or more major tasks called program processes. Processes executing in different nodes communicate with each other by sending a data message, consisting of one or more data packets, over the data network medium. In order for a received message to be processed by a destination program process, the data of the message must generally be stored in an area of memory called the data space of the destination process. In prior art systems, data received at a node must first be stored in a buffer register and then in an intermediate location in memory. These steps may be carried out autonomously without involving the host processor. Subsequently, the host processor examines the received data in the intermediate location in order to identify the destination process and to find an appropriate location in memory, generally in the data space of the destination process. The host processor then causes the received data to be transferred to this appropriate location in memory. The step of storing in an intermediate location and the subsequent examination and transfer steps degrade system performance by delaying the arrival of the received data in the data space of the destination process where it can be processed. The examination and transfer steps use expensive host processor resources and substantially reduce the data processing capacity of these expensive host processors.

Local data networks require reliable data transmission for many or all of their communication needs. In order to achieve such reliable transmission, prior art local data networks require that the host processors in each node devote a substantial portion of their resources to preparing data messages, checking received data messages, verifying that data messages have been properly received by a destination, and initiating retransmission of messages whenever necessary. Acknowledgment messages must be generated and transmitted from a message destination to a message source. Carrying out these functions substantially reduces the data processing capacity of these expensive host processors.

As discussed above, multiple destination messages are frequently required in local data networks. In particular, if duplicate data files, required for reliability, must be updated, the updating message must be sent to each of the nodes containing a copy of the file. Prior art local data networks require an especially heavy expenditure of expensive data processing resources to verify the reception of messages routed to multiple destinations. Each destination node must generate and transmit an acknowledgment message and each of these acknowledgment messages must be examined and related to the other acknowledgment messages received by the source node. Carrying out these functions further reduces the data processing capacity of the expensive host processors.

SUMMARY OF THE INVENTION

In accordance with the present invention, a data packet, including a destination address and data, transmitted on a local data network transmission medium is received and stored in a buffer register in a node of the local data network. The packet destination address stored in the register is used to generate control signals defining the address of the memory block in the node associated with the destination address; the packet data is then transmitted directly to storage in memory at the associated address.

In accordance with one aspect of this invention, address identification data indicating the packet destination addresses of packets whose data is to be stored in node storage of this node is stored in memory and, when a packet is received, the packet destination address is compared with the stored address identification data of the node. If the comparison indicates that the packet contains data to be stored in node storage, identification signals are generated which are used to derive control signals for controlling the transmission of the data of the received packet to the address in node storage associated with the received packet destination address.

In one embodiment of this invention, a content addressable memory is used to store the destination addresses of packets received by a node. Advantageously, this permits a large number of destination addresses to be recognized at each node.

In one embodiment of this invention, an interface processor controls the transmission and reception of data packets over the transmission medium, and the transmission of received data packets to an appropriate location in storage within the node. Advantageously, this arrangement reduces the data processing load of the host processors which carry out the data processing tasks within each node.

In one embodiment of this invention, a local bus is used at each node to communicate data among the modules of the node. A memory access arrangement controls transmission of data over that local bus, between a network interface connected to the medium and the host processors and node storage, and stores each packet directly in storage associated with a destination address.

In one embodiment of this invention, the host processor of a node specifies the addresses of the memory blocks in which the data of a received packet is to be stored. These addresses are then used to generate the control signals which are used to control transmission of the data of a received packet to memory at these addresses. Advantageously, such addresses are addresses of memory in the data space of destination program processes of the node.

In accordance with one aspect of this invention, a node is adapted to check for proper reception of a data packet by checking for errors in reception of a data packet and, generally, for any condition which prevents the storage of error free data in node storage. The node is also adapted to generate and transmit acknowledgment packets, representing either positive or negative acknowledgment of receipt of a data packet. A positive acknowledgment packet acknowledges proper reception of a packet; a negative acknowledgment packet acknowledges lack of proper reception of a packet. These acknowledgment packets may be generated in response to acknowledgment request data sent with a data packet or in response to data packets sent to specific packet destination addresses or to specific program processes. With such acknowledgment packets, it is possible to implement different reliability levels of transmission protocols. A low level protocol packet will require limited checks and no acknowledgment, whereas a high level protocol packet is fully checked and requires a receiving node to generate an acknowledgment packet. Advantageously, the extra operations required for high reliability data transmission are only performed when needed.

In one embodiment of this invention, the data processing and the generation of acknowledgment packets and other messages required to support higher reliability protocol checks are performed by the interface processor.

In one embodiment of this invention, when high reliability protocol checks on a particular packet fail, the packet is retransmitted under the control of the network interface processor. Advantageously, this further reduces the load on the host processor.

In one embodiment of this invention, the data of a data packet includes error check data. This error check data is used to detect errors within the packet data. Advantageously, this permits the data to be further checked separately by the receiving node.

In accordance with one embodiment of the present invention, data files may be duplicated by associating two file destinations in different nodes with the packet destination address contained in packets used to update the files. One of these destinations may be designated a master destination. The interface processor of the node containing the master destination generates acknowledgement packets when necessary. Advantageously, this reduces the special data processing required for transmission and reception of a data packet having multiple destinations.

In accordance with another embodiment of the present invention, one message switch of a larger data network interconnected by data links may be implemented by connecting data links to the nodes of the local data network. These data links communicate with other message switches of the global data network and with input/output terminals connected directly to the global network. Messages between source and destination data links connected to different nodes of the local data network are sent over the transmission medium.

BRIEF DESCRIPTION OF THE DRAWING

The invention may be better understood with reference to the following description taken in conjunction with the drawing in which:

FIG. 11 shows the layout of memory used for controlling additional functions executed in processing a request for medium or high reliability transmission of data packets;

FIG. 12 shows the layout of memory used for controlling additional functions executed in receiving data packets transmitted with medium or high reliability protocols; and FIG. 13 shows a process control block for a host processor program process.

DETAILED DESCRIPTION

Figure 1:
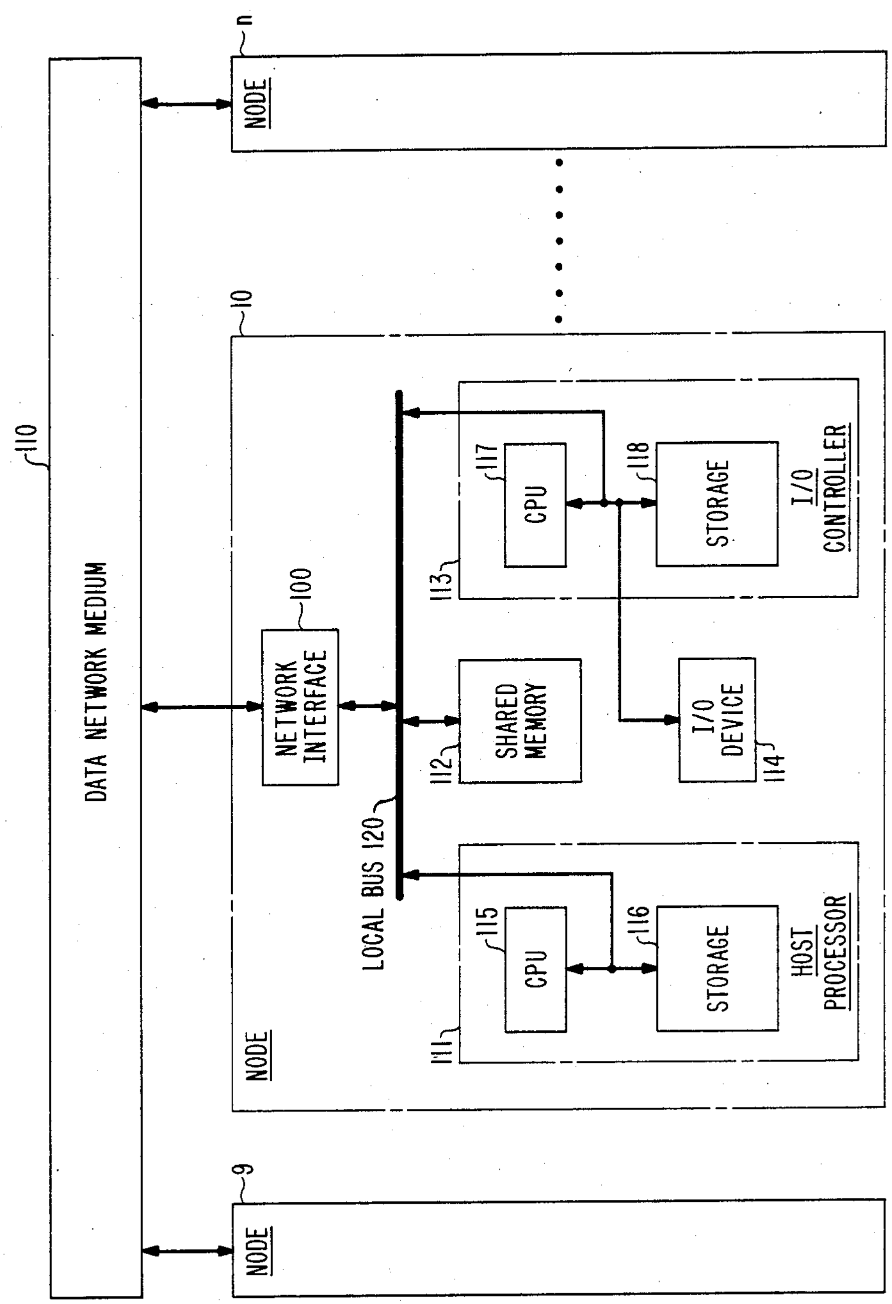
FIG. 1 represents a local data network including a block diagram of a typical node.

FIG. 1 shows a local data network including a block diagram of one of the nodes, node 10. The data network medium 110, a transmission medium, interconnects all the nodes, i.e., nodes 9, 10, . . . , n, of the local data network. This medium may be, for example, a coaxial cable with a tap allowing the attachment of an interface, such as network interface 100. The interconnection medium and the method of resolving contention among nodes for access to the medium in the present embodiment is similar to that described in R. M. Metcalfe et al., U.S. Pat. No. 4,063,220, and that used in the Ethernet TM system of the Xerox Corporation. Other media and contention resolution mechanisms, such as token passing, well known in the prior art, could also be used.

In this illustrative system, data processing tasks are performed in each node. Data is communicated between the nodes via the data network medium which is connected to a network interface at each node. In typical node 10, data is transmitted between such a network interface 100 and the rest of the node in local bus 120. Local bus 120 is connected to data processing module of the node such as: a host processor 111 comprising a central processing unit 115 and storage 116; an input/output controller 113 comprising a central processing unit 117 and storage 118 connected to and input/output device 114 such as a terminal, printer, card reader, or data link; and shared memory 112. The input/output controller can also be used for controlling bulk memory devices such as drives for magnetic disks or tapes. Node storage means for the node include storage such as a shared memory 112, host processor storage 116, and input/output controller storage 118. In alternate nodal configurations, the only node storage means could be the storage 116 directly associated with the host processor 111.

The host processors execute basic tasks of the system called program processes, or host processes. In this distributed processing system, different program processes are executed on different processors in different nodes which do not directly access a common memory. The processors in different nodes of this system are interconnected only by the data network medium; processes executing on processors in different nodes communicate with each other, not by storing data in a commonly accessible memory, but by sending messages, comprising packets of data, over the data network nedium. The host processors also contain message handler programs, well known in the prior art, which communicate with application program processes executing in the host processor. Some of the functions of conventional message handler programs are executed in this system by the interface processor, and these are explained in detail in this description.

The host processor 111 in this system does not directly control the sending of packets to the data network medium. It communicates various types of requests to the network interface 100, including requests to send a packet stored in a block of memory, called a transmit buffer, in memory 116 of the host processor 111 or in shared memory 112. The network interface communicates responses to these requests, including the response that a requested packet was sent back to the host processor. The network interface also controls the reception and storage of incoming data packets and notifies the host processor when a data packet has been received.

While node 10 is shown with only one host processor and one shared storage, it is possible to have more than one host processor at any node. Memory layout diagrams in this description indicate where a processor identification is needed in case a node has more than one host processor. I/0 controllers may be treated as separate host processors if they are capable of action independent of an associated host processor.

A major objective of the exemplary distributed processing system of FIG. 1 is to achieve high reliability system performance. In a distributed processing system, if some module fails, other modules are available to take over their function. In order to achieve high reliability system performance, it is important that a given data processing function not be tied to a given data processing, storage, or input/output module. Flexible assignment of data processing functions can be achieved by the use of logical channels to communicate between processes executing on different processors. Each logical channel is defined by a destination address sent with every packet associated with that logical channel. Each node stores a list of destination addresses associated with that node and is responsive to receive and retain any packet identified with one of these destination addresses. Thus, a given packet, destined for use by a given destination program process, can be routed to whichever node in the system has been assigned to execute the destination program process. Note that in this system, in which each node has access to the data network medium, only memory set-up operations are required to create a channel, and that no physical path need be specially set up. Hence the term logical channel.

Figure 2:
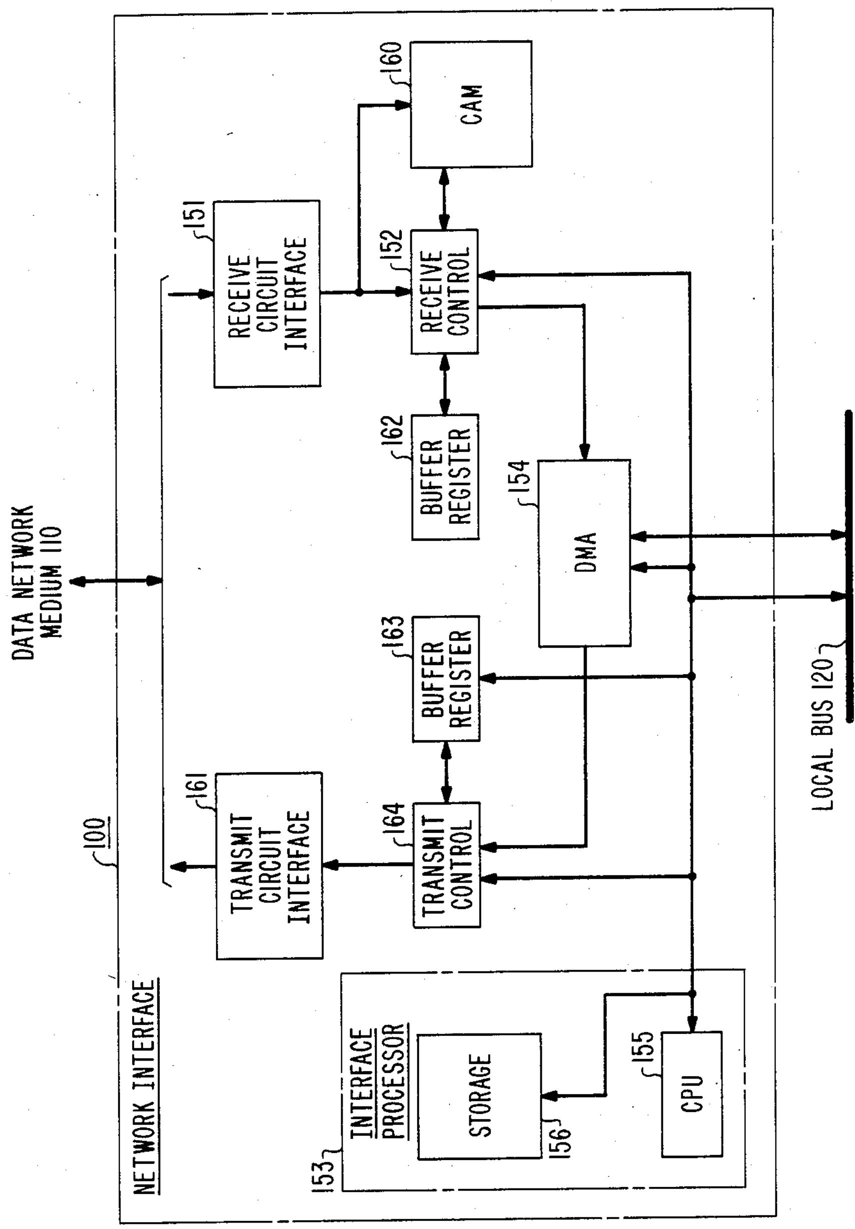
FIG. 2 is a block diagram of a network interface for one node.

FIG. 2 shows details of network interface 100. A receive circuit interface 151 is connected to the data network medium 110 and receives signals from that medium. These signals are then stored in buffer register 162 by receive control 152. Buffer register 162 stores the packet data of any received data packet and an initial header including the packet destination address of a packet. A transmit circuit interface 161 is also connected to the data network medium 110 and is used to transmit signals on that medium representing data stored in buffer register 163. Buffer register 163 is loaded with the packet data of a data packet to be transmitted on the medium under the control of transmit control 164; the initial header is loaded directly from network interface processor 153 into transmit buffer register 163.

The central processing unit (CPU) 155 of network interface processor 153 is a 32-bit microprocessor, the Western Electric BELLMAC TM 32A, in this system; other commercially available microprocessors such as the Motorola MC 68000 could also be used. CPU 155 can access buffer register 162 via receive control 152 and can access buffer register 163 directly. It can set up commands in the transmit control 164 (e.g., transmit a packet, load buffer register 163 from the output of direct memory access 154, write a word in buffer register 163); the receive control 152 (e.g., transmit a packet in buffer register 162 to direct memory access 154 for storage in node storage, read a word in buffer register 162, discard a packet in buffer register 162); and the direct memory access 154 (e.g., transmit a block of data received from receive control 152 to local bus 120 for storage in node storage starting at a specified address, transmit a block of data from node storage starting at a specified address to transmit control 164 for storage in buffer register 163). Direct memory access circuits of the type shown in block 154 are well known in the prior art and are commercially available. Interface processor 153 is also connected to local bus 120 in order to access hode storage such as storage 116 associated with host processor 111, and in order to permit node processors such as host processor 111 to access the interface processor's storage 156. Receive control 152 can simultaneously control the reception of one data packet from network medium 110 and the transmission via direct memory access 154 of another data packet to node storage.

Transmit circuit interface block 161 and receive circuit interface block 151 are connected to the data network medium 110 and the transmit control 164 and receive control 152, respectively. The direct interface circuits in these blocks generate electrical signals to and receive electrical signals from the medium. These direct interface circuits are similar to those commercially available for use with the Ethernet network and handle functions including medium availablity detection, collision detection, and, in response to control signals from transmission control 164, back-off and retransmission after collision detection. In addition, in this illustrative system, circuit blocks 161 and 151 perform a number of other functions. They convert straight binary to Manchester coding and vice versa; Manchester coding is used for communicating over the medium as described further below with respect to FIG. 3. They convert from parallel to serial for transmission of one word received from transmit control 164 or serial to parallel for reception of one word transmitted to receive control 152 and content addressable memory 160. They generate or check the cyclic redundancy error check code data described further below, found in every packet in this system. Receive circuit interface 151 also derives a clock from the received electrical signals to sample that signal at the appropriate time. Output signals transmitted to the medium are clocked in transmit circuit interface 161 by a system clock (not shown). All of these functions are well known in the prior art and can be implemented using commercially available integrated circuit components.

Buffer register 162 is 8 kilobytes long and acts like a circular buffer. New packets received from the data network medium are added after previous packets, or are discarded immediately if not destined for this node. Receive control 152 maintains a load pointer for loading newly received packets, and an unload pointer indicating the starting address of packets in the receive buffer register which have not yet been disposed of by the interface processor. When a new packet is received, the load pointer is changed; if the packet is discarded by the receive control because the packet is not destined for this node, the receive control resets the load pointer to the start of that packet. When a packet has been examined by the interface processor 153 and, if necessary, data from the packet has been transmitted to node storage, the packet may be discarded from buffer register 162 and the unload pointer changed. If in loading the buffer register 162, data is received which would go beyond the limit indicated by the unload pointer, such data is not stored and an indication of buffer register 162 overflow is made available by receive control 152 to interface processor 153. The network interface processor examines previously received packets in order and, after having processed them and/or having caused their data to be stored in nodal storage, discards a packet by instructing the receive control 152 that the space for the packet may now be made available for new packets arriving from the data network medium; receive control 152 responds by moving up the unload pointer.

A destination address provides a means for each node to recognize whether a packet is destined for that node and is used to direct the packet data to an appropriate destination in storage within a destination node. The specific location within such storage is usually in the data space of the destination program process. When a match is detected between the destination address of the packet and one of the list of destination addresses associated with that node, the network interface accepts the data packet and routes it to an appropriate final destination memory within the node.

A receive port is a receiving end of a logical channel. It is set up when memory in the receiving node is properly initialized and when the content addressable memory 160, which stores the destination addresses of packets which are to be examined by the interface processor 153, stores the destination address in a memory location associated with that receive port. In each node, up to 64 receive ports are available, each associated with one of the destination addresses of packets received by a node. The receive port number represents a storage address identification used to select the address, in memory and identify where the data of the packet is to be stored. For control and initialization purposes, each node has one special destination address, called the physical address of that node, used as the destination address of packets directed to the control and maintenance system of that node, or to the interface processor of the node; each node must assign a receive port to the physical address at the time the node is initialized.

Network interface 100 is arranged so that data packets may be simultaneously transmitted and received. This means that one of the destinations of a data packet may be in the source node. This simplifies some of the system software since there is no need to check, whenever messages are to be sent to other processes, whether the receiving process is executed in the source node and to take alternate actions in that case.

Content addressable memory 160 is used to store a list of the packet destination addresses associated with data packets which are to be received in a node. Content addressable memories are well known in the prior art and are commercially available. Associated with each member of that list is a receive port number. The content addressable memory has internal circuitry for performing a comparison between a search function, the received packet destination address in this case, and a list of values of corresponding data, a list of destination addresses in this case; if a match is found, the content addressable memory reads the output data corresponding to the matched search function, a receive port number in this case. Thus, when the packet destination address of a received packet, stored in buffer register 162 and also sent to memory 160, matches one of the destination addresses stored in content addressable memory 160, the content addressable memory generates the receive port number associated with that destination address. This receive port number is later stored by receive control 152 in buffer register 162 in a position corresponding to the preamble (see discussion of FIG. 3) of a received packet. In this illustrative system, content addressable memory 160 receives the packet destination address directly from receive circuit interface 151; alternatively, memory 160 could receive this address from receive control 152.

The receive port number is later used by interface processor 153 to find the address of a block of memory, called a receive buffer, where the packet data of the packet is to be stored. Direct memory access 154 is used to control the transmission of data stored in buffer register 162 via direct memory access 154 and the local bus 120 to storage 116, shared memory 112, or storage 118. Data is passed, one word at a time, from buffer register 162 to direct memory access 154 by receive control 152;

the receive control is set up by interface processor 153 to a starting point within buffer register 162 and to the length of the block of data to be transmitted to nodal storage. The direct memory access receives, from interface processor 153, control signals representing the starting address of the receive buffer and an indication of the length of the block. The length of the total data packet was previously generated by receive control circuit 152 which stored this length in buffer register 162 in a position corresponding to the (not needed) preamble of the data packet (see FIG. 3).

For transmitting data from the node, buffer register 163 is loaded directly by interface processor 153 and, under the control of transmit control 164 and direct memory access 154, via local bus 120 from storage 116, shared memory 112 or storage 118. Transmit control 164 also generates signals to transmit circuit interface 161 to control back-off and retransmission following collision detection. Direct memory access 154 receives the starting address in nodal storage and the length of the block from interface processor 153; transmit control 164 also receives the length of the block from interface processor 153 and always starts loading data from nodal storage at the position just beyond the header of the packet.

The content addressable memory 160 is changed relatively infrequently. The arrangement used in this system is to write data from interface processor 153 into buffer register 163, and then, under the control of transmit control 164, transfer this data to content addressable memory 160. Alternatively, interface processor 153 could have direct access to memory 160.

A transmit port consists of a number of blocks of memory and is used to provide for communications between host processes and the network interface processor 153. The system provides up to 64 transmit ports in each node. Each transmit port has associated storage used for responses to the host program process which requested the transmission of a packet or some other action by the interface processor. After an action has been completed, a confirmation or denial response is returned to the requesting process, using the transmit port number to identify that process and using the response mechanism, described below with respect to FIG. 9.

High reliability system performance requires high reliability data transmission. Relatively few processes in a distributed processing system can tolerate the occasional loss of packets of data transmitted among these processes. In prior systems, the responsibility for insuring that data is transmitted reliably, and is retransmitted if necessary, lies with the host processors and processes which generate and receive such data. The present invention implements automatic retransmission under the control of the network interface processors, thus relieving the host processors of that portion of their load attributable to checking on the successful transmission and reception of the data packets.

In this system, high, medium, and low levels of message transmission reliability protocol are implemented. With low reliability protocol, or low level protocol, errors in the reception of data are detected via a well-known cyclic redundancy code (an error detection code) check. Each packet is transmitted with such check data. A transmitting host process is informed only of the successful or unsuccessful transmission of a packet onto the medium. Every received packet is checked using standard error checking algorithms to ensure that the check data is still valid. If the check data is no longer valid, an error has occurred in the transmission or reception of the packet and the packet received with such a detected error is discarded under the control of the interface processor.

If medium reliability or medium level protocol is used, each packet is acknowledged by a positive acknowledgment packet representing proper reception of a data packet, or a negative acknowledgment packet representing lack of proper reception of a data packet, generated under the control of the receiving node interface processor 153. If a packet is not acknowledged within a specified time or a negative acknowledgment packet is received, the interface processor notifies the transmitting host process; the host process may then call for the message to be retransmitted.

If high reliability or high level protocol is used, message retransmission up to a specified maximum number of times, in response to a negative acknowledgment packet or no acknowledgment, is automatic and under the control of the network interface processor. In addition, a sequence number is attached to each packet, so that missing packets can be detected by a receiving network interface processor which can then send an appropriate negative acknowledgment packet, resulting in retransmission of the necessary packets. Positive acknowledgment implies that the received packet was properly received including proper storage in an available receive buffer. The host processor is informed of a final positive or negative acknowledgment after any retransmission attempts have been made. Clearly, more or fewer levels of protocol, depending on the specific needs of a system, can be used in alternative implementations of the present invention.

Figures 3, 4, 5:
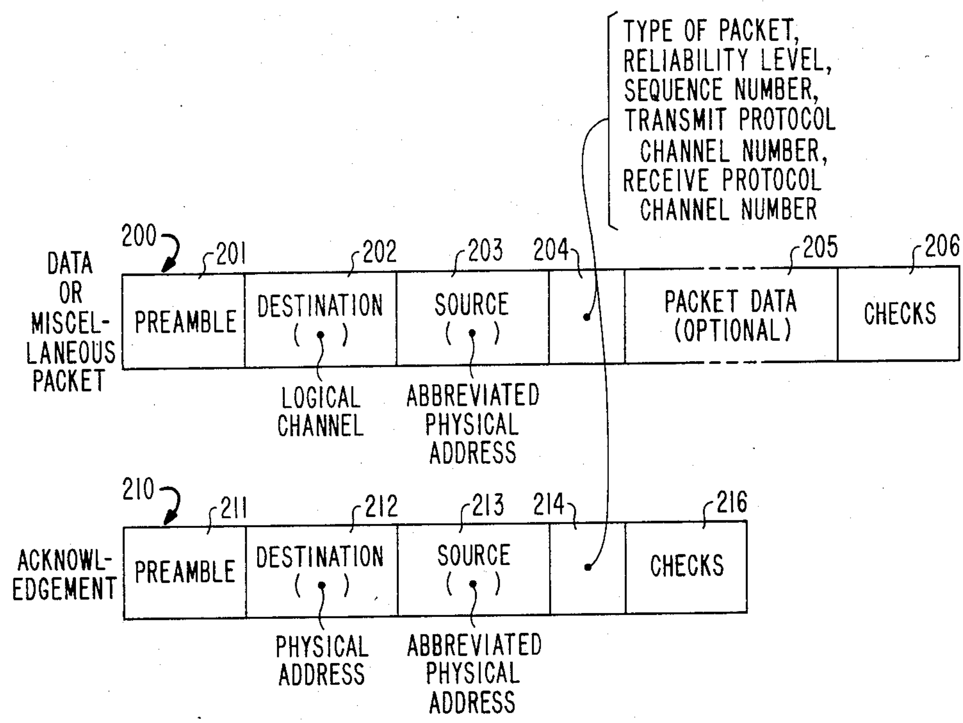
FIG. 3 shows the format of packets sent over the data network medium.
FIG. 4 specifies the use of the packet destination address spectrum.
FIG. 5 shows the layout of a content addressable memory used for identifying packet destination addresses.

In this illustrative system, a further check of packet data is made. The direct memory access 154 adds a separate cyclic redundancy code check to the data of data field 205 (FIG. 3). The data in the data field including this check is then checked by direct memory access 154 upon transmission to the destination memory 112, 116, or 118 (FIG. 1). This permits a complete check from source memory at one node to destination memory at another node.

In this illustrative system, a negative acknowledgment is sent out if a cyclic redundancy code check failure is encountered, even though a risk is incurred that the source address was incorrectly received. A packet received with a check failure is not discarded automatically by the receive control 152, but is examined by interface processor 153. If a check failure has been encountered, a negative acknowledgment packet is sent if the received packet was transmitted with medium or high reliability protocol. The packet is then discarded.

In this illustrative system, a pseudo channel, called a protocol channel, associates control data with the transmission of packets requiring medium or high reliability protocol. A protocol channel has two ends, one associated with a transmitting node, the other with a receive port on a receiving node. At each end of a protocol channel, the protocol channel identifies storage used by the interface processor to maintain data necessary for implementing the acknowledgment and retransmission features necessary for medium and high reliability protocol data transmission. A specific protocol channel exists between one source node generating data packets and a destination address of one destination node. Acknowledgment messages, sent via the logical channel associated with the physical address of the node which transmitted the packet being acknowledged, are associated upon receipt with a transmit protocol channel and are used to update the data controlling retransmission of data packets. Medium and high reliability protocol data messages are directly transmitted over a conventional logical channel, but convey data identifying an associated protocol channel. In this illustrative system, up to 128 transmit and 128 receive protocol channels are available at each node.

A data or miscellaneous packet format 200 capable of conveying the header data required to implement the functions described above, is shown in FIG. 3. (For convenience, the value of any byte is indicated in this description by the values of two hexadecimal characters, each ranging over the values 0, 1, . . . , 9, a, b, c, d, e, and f.) It consists of a header (fields 201–204), a data field 205, and a check field 206. The header starts with a preamble 201, a group of bits arranged in a standard pattern recognized by each circuit interface 151 as representing the beginning of a packet of data. This is followed by: a destination address field 202 representing the packet destination address; an abbreviated (2 byte or 4 hexadecimal character) physical address field 203 representing the physical identity (for example, 0009 for node 9) of the source node sending the message; and a miscellaneous control data field 204, described further below. Then comes the packet data field 205, if any, of the packet. Finally, the packet concludes with a group of check characters in check field 206 representing, in this system, check sums for a cyclic redundancy code; these are verified upon reception to see if the message has been received correctly.

There is no need in a system in accordance with this invention to indicate the size of the packet. The end of the packet is recognized by the fact that no more message bits are on the data network medium; the absence of data is detectable if, as in this system, Manchester coding (0=01, 1=10, absence of data=00 . . . 0) is used to represent data transmitted over the data network medium. One of the functions of the circuit interfaces 151 and 161 (FIG. 2) is to decode or generate, respectively, Manchester code representations of data to be stored in or transmitted from buffer registers in the network interface. Other known coding schemes could also be used.

Field 204 of packet format 200 comprises six bytes of data. One byte specifies the type of packet and includes types such as: data; request to set up a receive port; confirmation that a receive port has been set up; positive acknowledgment of a data packet (in format 210); and negative acknowledgment of a data packet (in format 210) specifying a type of failure (for example, cyclic redundancy check failure, receiving host processor failure, receiving interface buffer register full). The second byte specifies the level of protocol of this packet, representing acknowledgment request data. The third and fourth bytes specify the transmit and receive protocol channel numbers associated with this packet, and contain meaningful data only when medium or high level protocol is used. The fifth byte specifies the sequence number of this packet and contains meaningful data only when high level protocol is used. A sixth byte is used for maintenance purposes and is not pertinent to this invention.

Message acknowledgment is required for medium and high reliability protocol messages. An acknowledgment packet format 210 (FIG. 3) is used for positive and negative acknowledgment packets. The header of the original data packet being acknowledged contained the abbreviated physical address (field 203) of the source node. When an acknowledgment is sent, by the destination node, the destination address 212 is the full physical address (abbreviated address plus an identifying two byte prefix consisting of hexadecimal ffff to identify a physical address) of the source node, and the abbreviated physical address 213 of the destination node. The source node, as previously indicated, is prepared to recognize its own physical address as a destination address. The interface processor always examines the type byte within field 204 or 214 of any received packet before taking any further action. When a node receives an acknowledgment message, the interface processor recognizes that this is an acknowledgment message which corresponds to a message transmitted by this node. The transmit protocol channel number, also in field 214, is used to associate the acknowledgment message with a transmit request, as described below with respect to FIG. 11.

Throughout this description, reference is made to preparing packets. The interface processor 153 assembles the header which includes the various portions of fields 201–204 or 211–214 (FIG. 3) of the packet from the locations in which they have been stored and storing them in storage 156 (FIG. 2). Then, when the packet is to be transmitted, these fields are sequentially transmitted from interface processor 153 via transmit control 164 to transmit buffer register 163, thence to circuit interface 161 which transmits Manchester encoded signals on the data network medium. If the packet contains data stored in memory 112, 116, or 118 (FIG. 1), the direct memory access 154 transmits data corresponding to data field 205 (FIG. 3) from a location in memory 112, 116, or 118, to transmit buffer register 163 via transmit control 164, whence the data is transmitted to circuit interface 161 and data network medium 110. For packets whose data field is generated by interface processor 153, buffer register 163 is loaded directly one word at a time. Finally, circuit interface 161, which generates cyclic redundancy code (CRC) data throughout the transmission of the packet, transmits the CRC data representing field 206 or 216.

Packet reception is very similar. Once the content addressable memory 160 has found a match between the packet destination address of a received packet and one of the entries in memory 160, it generates a receive port number which is then stored by receive control 152 in receive buffer register 162, effectively being substituted for part of the preamble. The contents of fields 202–204 or 212–214 which are stored in receive buffer register 162 are used to control the setting up of message reception data. The identity of the receive port number is used by the interface processor to generate the address of a receive buffer in memory 112, 116, or 118, so that the packet data can be sent from receive buffer register 162 by receive control 152 and by direct memory access 154 via local bus 120 to memory 112, 116, or 118. Circuit interface 151 generates the cyclic redundancy code throughout the reception of the packet and generates an error signal representing results of the check which it stores in buffer register 162 with the receive port number for examination by interface processor 153.

FIG. 4 and 5 show the address spectrum of the destination addresses, and the layout of the content addressable memory 160 used to store such destination addresses. The destination address is a 4-byte (32 bit)

quantity which is shown for convenience in hexadecimal form (two characters per byte). Range 221, the specific destination address comprising all zeros, is reserved for broadcast messages destined for all nodes which are initialized to receive such broadcast messages. Range 222 consisting of addresses 00000001 to fffeffff is available for the assignment of other general purpose logical channels. 65,535 addresses in range 223 from ffff0000 to fffffffe are available to represent physical addresses of nodes, and are used to identify packet destinations or sources representing a node itself instead of a process executing on a node. Source addresses are transmitted in abbreviated form. An abbreviated physical address is the last two bytes of a physical address; for example, the abbreviated physical address corresponding to ffff123*a* is **123*a*. Finally, the address (range 224**) comprising all f's, corresponding to all 1's on a binary basis, is illegal.

The conventions for packet destination addresses used in this embodiment are not the conventions used in the Ethernet system. However, the changes required to modify the system to be compatible with Ethernet, should this be desired, are quite straightforward.

The addresses in block 390 of the content addressable memory represent the destination addresses associated with the 64 receive ports to which this node is responsive. As previously indicated, the destination address of every packet on the data network medium is compared with the contents of the content addressable memory 160 to see whether that packet is to be received by this node. Receive port 0 is usually reserved for broadcast messages associated with the broadcast destination address 00000000; therefore the contents of location 391, corresponding to receive port 0, are hexadecimal 00000000. Location 392 contains the receive port number, 0, corresponding to location 391. Receive port 1 is associated with the physical address of the node. Therefore, the contents of location 393 of node 10 (ten) are hexadecimal ffff000*a*. (000*a* is hexadecimal ten.) The contents of memory locations 395, . . . , 397 are the packet destination addresses associated with receive ports 2, . . . , 63, respectively.

As an early step in overall system initialization, each processor must be made capable of accepting instructions from some overall control node. In order to listen for messages on the interconnection medium, each node must open a receive port; in order to be able to receive initialization, control, and maintenance messages and messages requesting the opening of a receive port, it is convenient for each node to open a receive port associated with its own physical address (within range 223 of FIG. 4) to be used for messages to the control system of a node. When this receive port has been opened, the node is prepared to accept messages to the physical address of that node. Initial messages from a system initialization process in a control node of the system to a node initialization process in each node will selectively open a set of receive ports to allow each node to communicate with other nodes, and will initiate the execution of the basic program processes assigned to each node.

In order to understand the detailed operation of this system, it is most convenient to follow the flow of data from a host processor 111, to interface processor 153, to the data network medium 110, to the receiving node interface processor, to the receiving host processor. This can be done by following the flow of information through the memory layout diagrams of FIGS. 6-12.

For ease of understanding, memory blocks will be referred by their contents. Also, for convenience, only one copy of each memory block is shown although several similar blocks are in use simultaneously and are in use in different nodes, such as a transmitting node and a receiving node.

Data is sent over logical channels, each identified by a specific packet destination address, which originate at one or more transmit ports and terminate at one or more receive ports. Initializing or opening a transmit port, one of 64 in this system, reserves the memory space required in the interface processor to allow a host program process in a host processor to receive responses from the interface processor to requests from that host program process, including the request to transmit a data packet. Initializing or opening a receive port prepares the network interface to accept all messages, including those sent from this node, addressed to that receive port. Initializing or opening a protocol channel prepares a network interface to store and exchange data necessary to implement medium or high reliability protocol data transmission of a packet or series of packets; a protocol channel associates a given receive port with all ports of one node transmitting to that receive port. Associated with each of these ports and channels are the blocks of memory described below.

Figure 6:
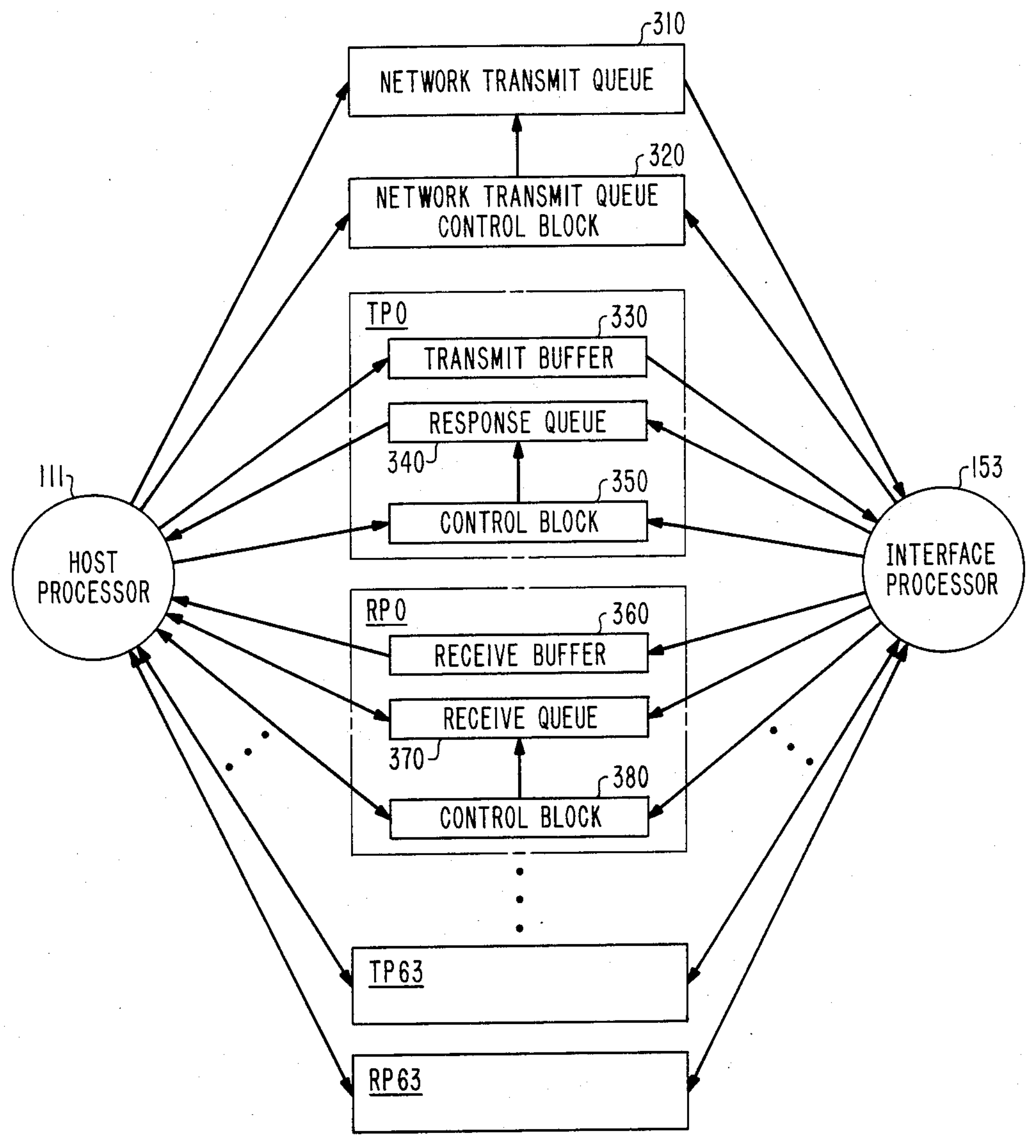
FIG. 6 shows an overall layout of memory used for controlling the transmission and reception of data packets.

FIG. 6 shows some of the memory blocks used for communications between a host processor 111, and an interface processor, 153, in the same node. If the host processor makes a request of the interface processor, such as a request to transmit a packet of data, the host processor makes an entry in the network transmit queue 310 at a location indicated by the network transmit queue control block 320. The entry specifies a transmit port; in addition, in case a data packet is to be transmitted, the entry points to the transmit buffer 331 within a transmit buffer area 330 associated with that transmit port where the data of the packet, previously loaded by host processor 111, is to be found.

Each transmit port has an associated response queue 340 and response queue control block 350 for storing responses from the interface processor 153 to a host processor 111. The response queue 340 is loaded by the interface processor 153 and stores responses to requests to send a data packet or responses to other requests from the host processor. The control block 350 keeps track of which responses have been processed by the host processor, and where the next response from the interface processor should be stored.

Figure 8:
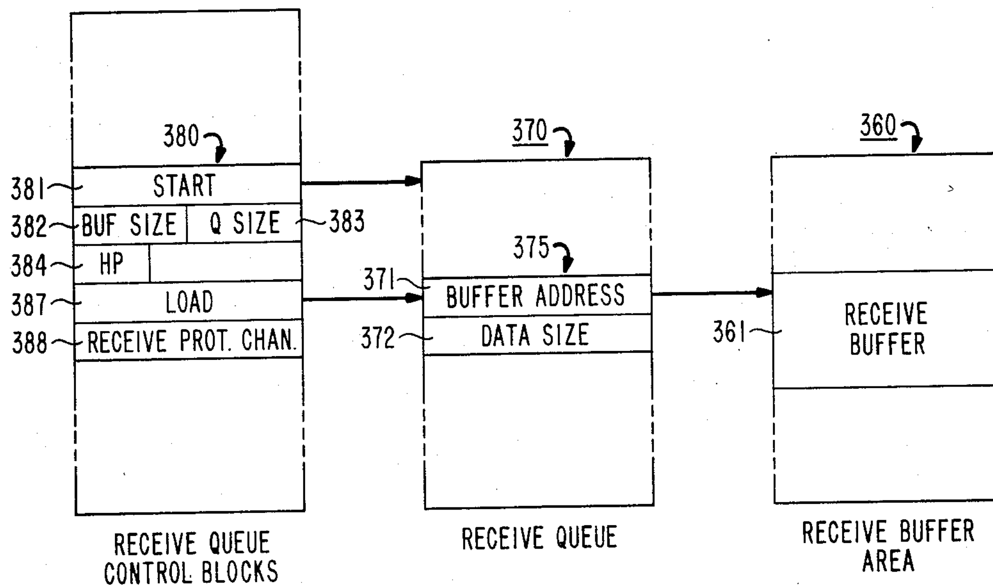
FIG. 8 shows the layout of memory used for controlling reception of data packets.

For packets received by a node, the interface processor causes received data to be transmitted to a receive buffer such as 361 within receive buffer area 360 (see FIG. 8). Each receive port has its own receive queue control block 380, and generally has its own receive queue 370 and its own associated set of receive buffers such as 360. The location within a receive buffer area 360, such as a receive buffer 361 (see FIG. 8), where the next packet is to be stored is placed in receive queue 370 by host processor 111, at an address specified by control block 380. As described below with respect to FIG. 8, it is possible to associate several receive ports with one receive queue and one set of receive buffers.

Figure 7:
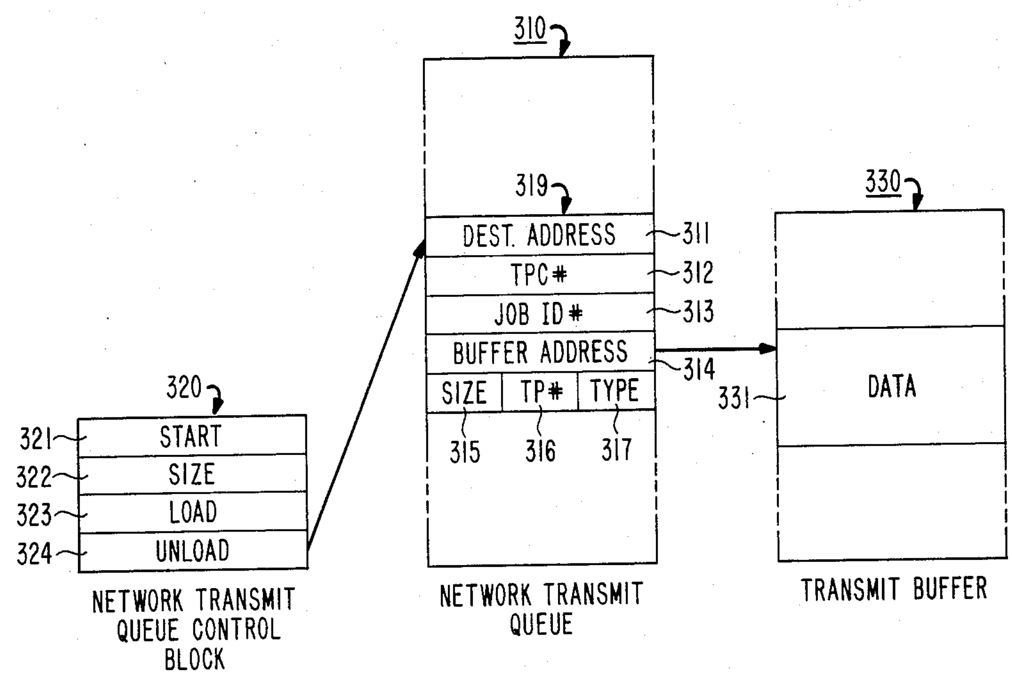
FIG. 7 shows the layout of memory used for controlling data transmission and for making requests of the interface processor.

FIG. 7 shows more detailed memory layouts associated with the transmission of data packets. Consider the case in which a low reliability protocol packet is to be transmitted. The host processor generates a message and places it in a block 331; within transmit buffer area 330. The transmit buffer block 331 is linked to an entry 319 in the network transmit queue 310 by the pointer 314 to the starting address of block 331. The entry 319 in the network transmit queue 310 also contains the destination address 311 of the packet, a job identification number 313 subsequently used to properly associate a response queue entry with the host process, the size 315 of the data of the packet, the number 316 of the transmit port to be used, and a type 317 identifying this as a low level protocol data message. The load pointer 323 of the network transmit queue control block 320 is updated to inform the interface processor that a new entry has been entered into the network transmit queue.

Thereafter, the interface processor recognizes that a request has been loaded by the host processor by detecting a mismatch between the load pointer 323, which points to one entry beyond the most recently loaded request, and unload pointer 324, which points one entry beyond the transmit queue entry of the request most recently processed by the interface processor. The interface processor examines the contents of the entry indicated by its unload pointer and increments unload pointer 324 to point to the next network transmit queue entry in preparation for subsequent examination of that next entry when that next entry has been loaded.

The interface processor prepares a packet of the format 200 (FIG. 3). It locates the packet destination address 311 (FIG. 7) and the type of packet 317 in transmit queue entry 319. For a data message, the source physical address which is associated with the sending node is found in a copy (not shown) of location 393 of table 390 (FIG. 5) retained in interface processor storage 156 (FIG. 2). The data of the message is found through the buffer address pointer 314 (FIG. 7) and the size of the block of data in location 315 in the network transmit queue entry. When the data packet has been transmitted to the data network medium, the interface processor makes an entry in the response queue 340 (FIG. 11) associated with this transmit port indicating by means of an appropriate response type, that a data packet had been transmitted.

For requests from the host processor to the network interface processor for actions other than the transmission of a data message, such as the opening of a protocol channel or a port, the type of request is stored in location 317 of the network transmit queue by the host processor. The network interface responds to this type of request indication by taking the appropriate action and storing its response in the response queue 340 (FIG. 11) associated with the transmit port of the request.

Three data queuing systems are used in this system, each controlled by a queue control block arrangement. Of these, the network transmit queue control block 320 (FIG. 7), one required in each node, and response queue control blocks 350 (FIG. 9), one required per transmit port, share certain characteristics. Each contains a start pointer (321 and 351, respectively), a size indicator (322 and 352, respectively), a load pointer (323 and 354, respectively) which points to the location in the queue in which the next entry is to be made, and an unload pointer (324 and 355, respectively) which points to the next entry to be unloaded. Each time an entry is loaded or unloaded, the load or unload pointer, respectively, is incremented to point to the next potential entry. Each time one of these pointers is incremented, a check must be made to make certain that the entry will still be made in or taken from the queue; this is done by comparing the start pointer plus the queue size, with the incremented pointer plus the size of an entry. If the incremented pointer plus the size of the entry exceeds the end of the queue, then the pointer, instead of being incremented, should point to the beginning of the queue.

The presence of a new entry is detected by finding a mismatch between corresponding load and unload pointers. Potential queue overflow is detected, prior to loading an entry, by detecting a match between the incremented version of the load pointer and the unload pointer; if there is such a match, the entry will not be loaded. (This will always leave one potential entry unavailable but simplifies both the detection of queue overflow and the incrementing process.)

Operation of the receive queue control blocks 380 (FIG. 8), receive queues 370, and receive buffers such as 361 is different. The different approach makes it possible to avoid requiring a relatively expensive unusable receive buffer (corresponding to a relatively inexpensive unusable queue entry in the previous cases) and to avoid the necessity of always allocating a relatively expensive, possibly unnecessary, receive buffer for each space in the receive queue. This is done by providing each queue entry with data indicating availability of assigned buffer storage space for use in storing received messages.

A receive queue control block 380 is associated with each receive port. The receive queue control block has a load pointer 387 which points to the next receive queue entry. Each entry in a receive queue 370 is capable of being associated with a single receive buffer, a block of memory associated with one or more receive ports used to store the data of a received packet. An entry 375 contains the address 371 of the associated receive buffer 361 and the size of the block of data stored therein. A receive queue entry corresponding to an empty available receive buffer contains the address of the buffer and a blank (all zeros) data size field. The host processor makes a queue entry available by writing therein the address of an available receive buffer and setting the data size field to zero. A receive queue entry corresponding to a full buffer (i.e., the corresponding receive buffer is not available for reception of new data packets) contains a non-zero value for both buffer address and data size; the data size is changed from zero by the interface processor when the corresponding receive buffer is loaded. If no receive buffer has been allocated because of lack of available memory space, the buffer address field is all zeros; the host processor sets the buffer address field to all zeroes when it starts to process the data in the corresponding receive buffer, prior to allocating a new receive buffer to this queue entry. Thus, a receive queue entry corresponding to an available receive buffer is recognizable by having a nonzero value in the buffer address field 371 and a zero value in the data size field 372; if the next receive queue entry pointed to by load pointer 387 has other values, this is equivalent to detection of queue overflow, and is one of the conditions reported in a negative acknowledgment packet.

The receive queue control block also specifies the size 382 of each receive buffer; this size is set when a receive port is initialized. The start 380 and size of the queue 383 are also set at receive port initialization time.

Memory layouts associated with reception of data will now be described. When a packet is transmitted on the network medium 110, network interface 100 checks to see whether the packet on the medium is destined for this node by comparing the destination address in position 202 or 212 of message format 200 or 210 (FIG. 3), respectively, against the list of network addresses stored in table 390 (FIG. 5). If there is a match, the number of the corresponding receive port is identified. The search for a match and identification of the corresponding receive port is most conveniently performed by a content addressable memory 160 or some system having search capability properties within the appropriate time constraints; the message destination must be identified before the next packet is received in order to allow a packet not destined for this node to be discarded, thus avoiding filling buffer register 162 with irrelevant packets. The destination address is used as the search function of the content addressable memory, which generates the identity of the receive port when there is a match between the search function and one of the stored destination addresses.

Associated with each receive port is a receive queue control block 380 (FIG. 8) which controls the storing of information in a receive buffer. Control block 380 contains the starting address 381 of the receive queue, the size 382 of each receive buffer such as 361, the size 383 of receive queue 370, the identification 384 of a specific host processor within the node, the number 388 of an associated receive protocol channel, and a load pointer 3B7. Load pointer 3B7 points to the receive queue entry 375 which in turn points to an appropriate receive buffer, which can be located in the data space of the destination program process. Buffer entry 375 includes a pointer 371, which points to a receive buffer 361 in receive buffer area 360 where the received data may be stored, and a size indicator 372 which indicates the size of the entry being made. The individual receive buffers need not be contiguous as shown in FIG. 8 but can be scattered in several blocks.

Sometimes, a relatively short receive buffer is assigned and a relatively long packet is transmitted. In this case, the data of one packet is sent via several direct memory access block transfers to several receive buffers corresponding to several consecutive receive queue entries. A special indicator (such as all binary 1's) in the data size field of a full receive queue entry indicates to the host process that the packet data is continued in another receive buffer; the host process can find the length of the entry in each receive buffer except the last by reading field 382, the buffer size field. The size indicator 372 associated with the last buffer contains the total size of the packet data.

In some cases, it may be desirable to associate a single receive queue and a single set of receive buffers with several destination addresses, hence several receive ports. This can be accomplished by designating one of these receive ports as a primary receive port and by linking or chaining secondary receive ports to the primary receive port through a linking or chaining entry in the receive queue control block. When a packet is received on a secondary port linked or chained to a primary receive port, the control block, receive queue and receive buffers associated with the primary receive port are used. A secondary port control block entry can be identified by having a zero in the start field 381 and a link or chain entry in the load pointer field 387.

Figure 9:
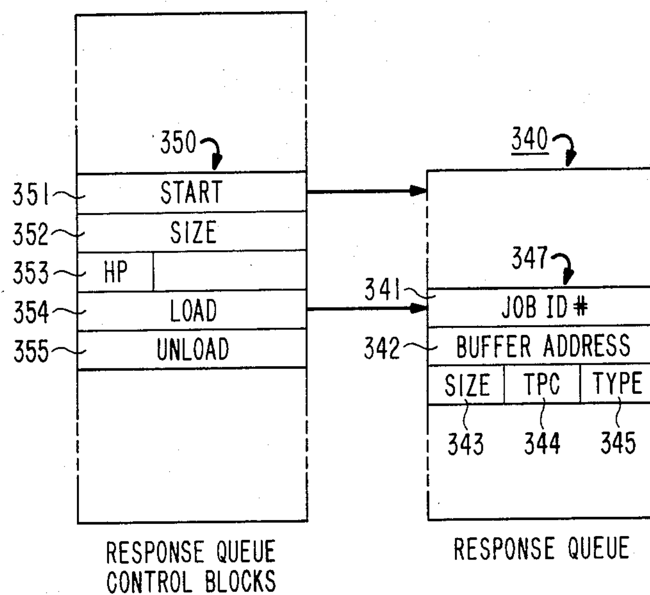
FIG. 9 shows the layout of memory used for communicating responses from the interface processor to host processes.
Figure 10:
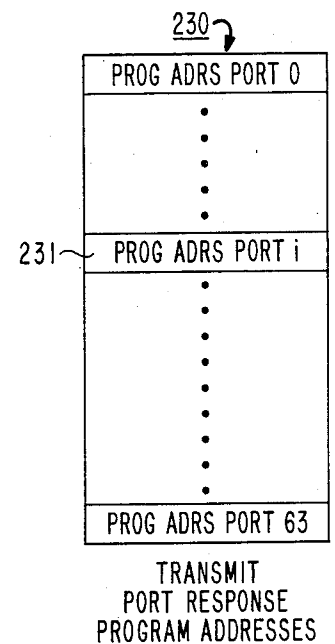
FIG. 10 is a table of program addresses used by a host processor for processing responses from the interface processor.

The response queue shown in FIG. 9 illustrates the method of communicating responses from a network interface processor to a host process. Associated with each transmit port, is a control block 350 which administers a response queue 340. Entries are loaded into the response queue by the interface processor, and are unloaded by the appropriate host processor, identified by the host processor number 353 which is initialized when the port is opened. The start 351, size 352, load 354 and unload 355 pointers are used as previously described, to administer a response queue 340 and are also initialized when the port is opened. One response queue entry 347 is shown. The entry in the response queue includes the job identification number 341, used by the host program process which generated the request or data packet to identify the response to that request or data packet. The entry also includes the buffer address of the packet 342, the size of the packet 343, and a type of response 345 (e.g., positive acknowledgment, negative acknowledgment, type of failure, successful opening of a port or protocol channel).

Also associated with each transmit port is a program address (Table 230, FIG. 10) to associate responses from that port with an appropriate program function of the host program process that made a request to the interface processor; these program addresses are stored in a transfer address table 230 and accessed by using the transmit port number as an index to find the program address associated with responses to a given transmit port. For example, the program address 231 associated with the i'th transmit port is in the i'th position in table 230.

The additional functions and memory layouts associated with medium and high level protocol transmission will now be described. The system is able to check for proper reception of a data packet, including ability to store received data in node storage. It checks received data via the cyclic redundancy (CRC) code, separately checks the CRC code of the data field, checks for availability of space in the receive buffer register and in a receive buffer, and checks that data was transmitted to the receive buffer.

In order to transmit using medium or high reliability protocol, a protocol channel must be opened. A transmit protocol channel is established between one node or network interface and one destination address and is associated with a receive protocol channel on the node which has a receive port capable of receiving that destination address. Any transmit port on the transmitting node can use the same transmit protocol channel. Functionally, the transmit protocol channel can be considered a channel for the transmission of packet reliability information between a transmitting network interface and a receive port on a receiving network interface.

If a plurality of receive ports on different nodes are associated with the same destination address, only one receive port, called the master receive port, will send back positive or negative acknowledgment packets to verify or deny proper reception of a data packet; in effect, only the master receive port will be associated with an active receive protocol channel.

Each transmit protocol channel has a control block 410 and an associated linked queue 430, 438,. . . , 439, 440 (FIG. 11) of network transmit requests. Each time an entry in the network transmit queue requiring medium or high level protocol transmission is processed, the data in the transmit queue entry is stored in a new entry linked to the transmit protocol channel linked queue. This will allow the entry to be cleared from the network transmit queue so that subsequent entries in the transmit queue network may be processed. If the transmit protocol channel is available, the packet is sent out immediately. Otherwise, transmission is deferred until the protocol channel has processed previous requests and is available. Note that only after each entry in the linked queue has been fully processed, including an acknowledgment, does processing of the next entry begin. Immediate availability of a transmit protocol channel thus implies an empty linked queue.

Each transmit queue entry, such as 430, contains: a link, 431, used to link to the next entry in the queue; a job identification number 432, subsequently used by the host process to associate a response with the proper host program process function; a buffer address 433, used to locate the data to be transmitted; the size 434 of the data field of the packet; the transmit port 435 to be used; and the type 436 of the request. This data plus the destination address stored in location 411 of the transmit protocol channel control block, the associated receive protocol channel number 414, and the transmit protocol channel number (originally used to access the control block 410), are all that is necessary to control the processing of the original network transmit queue request represented by the transmit protocol channel linked queue entry.

When a message requiring medium or high reliability transmission protocol is to be sent to a given receive port, the interface processor first checks to see if a transmit protocol channel already exists. If not, such a channel is opened from the network interface of this node to the receive port associated with this destination network address at one node. A transmit protocol channel control block, such as 410 is initialized with the destination address 411 of the associated destination, the transmission protocol level 413, a transmit timeout limit 415, the current time 416 (updated each time a packet is transmitted), a limit on the number of repeated transmissions of a packet 417, an initial value of zero for the number of repetitions already incurred 418, and a convenient initial sequence number 412 (for example, 0). (The use of sequence numbers is described immediately below.) An indicator such as the value zero, is placed in locations 419 and 420 to indicate that the linked queue of the transmit protocol channel is empty. Subsequently, as entries are placed in the queue, pointer 419 is set to point to the first entry, and 420, to point to the last entry. Each entry has a link, such as pointer 431 which points to the next entry; the last entry has a special indicator in the location 441 of its pointer indicating that it is the last entry.

Sequence numbers are sequential numbers used with high reliability protocol in order to allow a protocol channel to check that no data packets were lost. An acknowledgment must not only be for a message properly received but must indicate the correct sequence number. Transmission of the next packet is delayed until there has been satisfactory transmission of the current packet and until such transmission has been acknowledged. Each acknowledgment message is checked for the proper sequence number before the next packet is sent when high reliability protocol is used.

After the transmit protocol channel control block has been initialized, a message is sent to the destination address requesting that a receive protocol channel be opened. This message is confirmed by a return message including the number of the assigned receive protocol channel; this number is inserted in location 414 of the transmit protocol channel control block 410. The interface processor notifies the host processor via an entry in the type field 345 of response queue 340 (FIG. 9) that a transmit protocol channel has been opened and returns the number of the transmit protocol channel in location 344.

The receiving node at the other end of a protocol channel initializes a receive protocol channel control block such as 460 within a receive protocol channel control block area 450 (FIG. 12). This control block contains the physical address of the transmitting node 461, which, as previously indicated, is the destination address of an acknowledgment packet. The sequence number 462 must be initialized to the value indicated in the request to open the receive protocol port. The status 463 of the protocol port, indicating the level of transmission protocol to be used, and the number of the transmit protocol channel 464 corresponding to this receive protocol channel are also initialized. The number of the receive protocol channel is also stored in location 388 of the receive queue control block 380 of the corresponding receive port.

In distributed data processing systems including distributed data base systems, it is frequently desirable to maintain duplicate files. It is efficient to update these files simultaneously as part of a single file update procedure. This is accomplished in accordance with the present invention by providing two copies, a master and a slave copy, located, for reliability reasons, in separate nodes. A single destination address is used to send update data packets to both copies. Queries for stored file data, as opposed to update requests, are sent only to the node containing a master copy; a separate destination address is used for such queries. When update packets are sent to both copies simultaneously, using medium or high reliability protocol, only the interface processor of the node containing the master copy sends acknowledgment packets. The interface processor or host processor of the node containing the slave copy keeps track of whether the entire update message was correctly received. After the master copy has been properly updated, the slave copy may be separately queried, using a separate destination address, to check whether the update message was correctly received; if not, the update message is retransmitted to the slave copy.

If the request to open a receive protocol port was addressed to more than one node, the type of message would indicate this fact, and the identity of the master node would be transmitted in the data field of the request message. In that case, the master/slave indicator 465 would be marked "master" in the control block of the master node, and "slave" in the control block of the slave node(s). As previously indicated, only the master node generates the normal acknowledgment messages, although the slave node(s) can subsequently be polled to check that they have also received the messages correctly. For the case in which a single node is the destination for the messages, the master/slave indicator 465 is set to the "master" state. The interface processor of the receiving node then sends a message to the transmitting node confirming the opening of a receive protocol channel and giving the number of the receive protocol channel as part of the control field 214 of packet format 210 (FIG. 3).

After protocol channels have been opened, as data messages are sent, the host process specifies the transmit prqtocol channel number 312 as part of any network transmit queue entry 319 (FIG. 7). The interface processor inserts the identification of the transmit and receive protocol channel number in field 204 of packet format 200 (FIG. 3). In response to a data packet, the interface processor of the receiving node generates a positive acknowledgment packet confirming proper reception or a negative acknowledgment packet reporting lack of proper reception including an imperfectly received data packet and other problems. The network interface of the receiving node transmits the positive or negative acknowledgment packet back to the transmit network interface, identified from field 203 of the original data packet, with the number of the transmit protocol channel, and including a sequence number if high level protocol transmission is used with this protocol channel. The destination address 212 (format 210) of this packet is the physical address of the transmit network node. When a network interface receives a message it checks to see if this message is an acknowledgment and if so, finds the number of the transmit protocol channel in order to access data of the transmit protocol channel control block and linked queue (FIG. 11). The acknowledgment message sequence number is compared with the sequence number 412 of the appropriate transmitting protocol channel to check that no packets have been lost. If the acknowledgment is positive, the sequence number 412 is incremented and the protocol channel allows the transmission of the next packet, if any, to commence; if the acknowledgment is negative or missing, the packet is retransmitted using the previous sequence number.

Consider now the full process of sending a high reliability protocol packet to another node. For this example, the packet is sent from node 10, with physical address ffff000a (a is hexadecimal ten) to node 9, with physical address ffff0009. Memory layouts for node 9 are not shown; to simplify the description, memory in node 9 is given the same reference numbers as memory in node 10. The packet is sent by program process 5 to destination address 00000015.

As previously indicated, packet data is generated and received by program processes executing on a host processor. Each program process has an associated control block for storing data necessary for overall control of the process. Process control block 500 (FIG. 13) associated at this time with process 5 stores a process number 501, a job identification number 502, a transmit port number 503, a transmit protocol channel number 504, the address 505 of a buffer containing the data of a message to be transmitted, an indicator 506 of the size of the packet data, the packet destination address 507 of the message, and a program address 508 associated with response queue entries corresponding to the job identification number stored in location 502. If the process control block were to be associated with the reception of data, the receive port number would be stored in location 510 and a program address for processing received data stored in location 509. We will assume that the job identification number assigned by the process to handling responses to this data packet transmit request is 175. The process control block also contains other information not pertinent to this example. At the beginning of the example discussed herein, the process number 501 has been initialized to 5, the address 505 of the buffer and size 507 of the packet data have been set as a result of the previous processing actions whereby the process generated the data to be transmitted, the destination address 507 has been initialized to 00000015, the job identification number 502 has been initialized to 175, and the program address 508 has been initialized to be responsive to responses to the request to send a data packet.

Process 5 first causes a response queue for a transmit port to be opened and the response queue control block for that transmit port to be initialized. Process 5 hunts for an available transmit port by looking over table 230 of queue response program addresses (FIG. 10) to find a port with a blank entry. In this case, port 7 has a blank entry and is selected. Therefore, the response queue control block for transmit port 7 is initialized. Locations 351 and 352 are initialized to indicate the starting address and size of the response queue and the load and unload pointers 354 and 355 are initially set to point to the first location in response queue 340. Location 353 is initialized to the number of the requesting host processor if there is more than one processor in the node. In addition, a program address must be initialized in table 230 (FIG. 10) to associate responses from transmit port 7 to the program process controlling that transmit port.

Host processor 111 next requests the interface processor 153 to open transmit port 7. The request is loaded as an entry in network transmit queue 310 (FIG. 7). The job identification number (175) is loaded in location 313, and the representation of a request to open a transmit port is loaded as the type of request in location 317. The transmit port number 316 is set to the value 7, previously derived. After these entries have been made in the network transmit queue 310, the load pointer 323 is updated to point to the next network transmit queue entry.

Subsequently, the interface processor 153 detects a mismatch between unload pointer 324 and load pointer 323, in response to which it processes network transmit queue entries. When the interface processor processes the present entry, it recognizes that the type of request, stored in location 317, requires the opening of transmit port 7. The response to the host process, indicating the successful opening of a transmit port is stored in the next available location in the response queue of transmit port 7 specified in the request. The response comprises the job identification number (175), the number of the transmit port (7) just opened in field 344 which is usually used for the transmit protocol channel number, and a type indicator (transmit port opened). The host processor and interface processor always read the type indicator first, and so are able to interpret the contents of a field differently if this is required for a given type of response, request, or packet. This response is then transmitted via the response queue to the requesting process, process 5.

Next, a packet must be sent to node 9 requesting that a receive port be opened in node 9. The entry that is loaded into the network transmit queue (FIG. 7) contains the following items: the destination address 311 is the physical address of node 9, ffff0009; the job identification number (location 313) is 175; the type of request 317 is a request to open a receive port; and the transmit port number in location 316 is 7. The destination address 00000015 which must be transmitted to node 9 in order to tell node 9 which destination address should be associated with its receive port is loaded in location 314, since no buffer space is needed for this message. A packet is then sent to node 9 over transmit port 1 using node 9's physical address (ffff0009) as the destination address, the abbreviated form of node 10's physical address (000a) as the source address, and including the destination address 00000015 in the data field 205 of the packet. In this case, the short data field as well as the header data are set up directly in buffer register 163 by processor 153.

The request packet is detected by the interface processor of node 9 which checks the type of all incoming data packets. In response to this message node 9 selects an available receive port. For this example, receive port 3 will be selected. Node 9 must initialize an entry in table 390 (FIG. 5) in its content addressable memory so that the destination address associated with receive port 3 is the destination address 00000015. Memory must be allocated for messages received over receive port 3. This memory includes a receive queue control block such as that shown in the layout of 380 (FIG. 8) which points to receive queue entries such as those shown in the layout of block 370 which in turn point to receive buffers such as block 361. The receive queue control block must indicate the starting location of the receive queue 381, the load pointer 387, used to point to the appropriate receive queue entry, the size of each receive buffer such as 361 in location 382, and the size of the receive queue in location 383.

Node 9 then sends a confirming message to the physical address of node 10 informing node 10 that a receive port has been opened which will be responsive to packet destination address 00000015. When this message is received at node 10 an entry is made in response queue 340 associated with transmit port 1. The entry will identify the job number 175, and will indicate by the response type that the response was the successful opening of a receive port. This response will be routed to process 5, the process which requested the action.

Many other techniques are available for requesting that a receive port be made available in another node. For example, a master control node might receive such a request; the master node could send a destination address and open receive port request. Alternatively, each node could open its own receive ports and broadcast the corresponding destination addresses to all nodes.

Host processor 111 next requests the interface processor 153 to open a transmit protocol channel. Since a transmit protocol channel to a common destination can be shared by several transmit ports, the network interface processor compares the destination address with the destination addresses stored in the transmit protocol channel control blocks of all transmit protocol channels in transmit protocol channel control block area 400 (FIG. 11). If a match were found, a response would be sent via the response queue of transmit port 7 indicating the number of the transmit protocol channel in location 344 (FIG. 10) of the response. Here, no protocol channel exists from node 10 to destination address 00000015, so that a protocol channel must be opened. The request to open a transmit protocol channel passed to the network interface processor via the network transmit queue 310 (FIG. 7), includes a job identification number in location 313, the transmit port number in location 316, the request to open a protocol channel in type field 317, a timeout limit passed in location 312 and a retransmit limit, passed in location 314. The interface processor first examines the type field 317, and can interpret the contents of locations 312 and 314 differently for this request.

Assume transmit protocol channel 2 is available and is selected. The transmit protocol channel control block 410 (FIG. 11) for transmit protocol channel 2 must be initialized with the destination address 411 of the receive port associated with the transmit protocol channel, the receive protocol channel number 414 at the receiving network interface, the time out limit 415 associated with individual packets sent on the channel currently associated with a given transmit protocol channel, the limit 417 on the number of repetitions or attempts to send the message before the host is notified that the packet cannot be delivered, and a sequence number 412. The network processor, after opening the transmit protocol channel makes an entry in the response queue for transmit port 7 reporting the transmit protocol channel number in location 344 and reporting the successful opening of the port via the type field entry in location 345.

Next, host processor 111 sends a request to network interface processor 153 via an entry in the network transmit queue 310 (FIG. 7) requesting that a receive protocol channel be opened at node 9 to correspond to transmit protocol channel 2. For this request, the destination address 311 is 00000015, the transmit protocol channel is 2, the job identification number is still 175, the transmit port number is 7, and the type of request is the request to open a receive protocol channel. A message is generated transmitting this data to destination address 00000015. The request is detected by the interface processor of node 9 which checks the type of all incoming data packets. In response to this request a receive protocol channel number and a receive protocol channel control block are assigned in node 9. In this case, the receive protocol channel number is 6, and the receive protocol channel must be initialized with the physical address of the transmitting node (ffff000a, transmitted as an abbreviated physical address in field 203, FIG. 3), the initial sequence number to be used in transmissions over this protocol channel (received as a sequence number in field 204), the transmit protocol channel (2) corresponding to this receive protocol channel, and the receive port number (3) associated with this receive protocol channel in node 9. Node 9 will then send to destination address ffff000a (the physical address of node 10) a packet indicating that receive protocol channel number 6 has been opened to correspond with transmit protocol channel 2 of node 10. This information is received in node 10 and loaded into the response queue (FIG. 9) of transmit port 7 to inform the host process (process 5).

Transmit port 7 is now ready to transmit high level protocol data packets using destination address 00000015 to receive port 3 of node 9 using its transmit protocol channel 2 of node 10 and the associated receive protocol channel 6 in node 9. High level protocol packets can be transmitted in format 200 (FIG. 3) and acknowledged in packets of format 210. All data packets will be checked, acknowledged, and, if necessary, retransmitted up to the limit initialized in 417 of the protocol channel control block 410 (FIG. 11). All packets have a sequence number which is checked to ensure that no packets are missing or have been received out of sequence.

In this system, only single packet messages are used. Very long messages are relatively infrequent. The host processor breaks up such messages into groups of single packet messages. For systems in which long messages are more frequent, it would be appropriate to have the interface processor perform the packetizing function. The size field (315) of any message in the network transmit queue or transmit protocol channel transmit queue would be examined by the interface processor. The processor would keep a current pointer to the transmit buffer, a current packet size indicator, and a flag that a particular message contains more than one packet.

After each packet has been sent, this flag would be examined, and if necessary, another packet would be sent. The response queue entry would be made only after the full message had been transmitted. Acknowledgment packets could be sent back after each packet, after every m packets, or only at the end of the message, according to the needs of a particular application.

If two or more of the nodes have an I/O device such as 114 which is a data link to some other data network or to data terminals, then the local data network described herein can be used as a local data switch or as a message switch for a larger global data switching network. Data messages going outside the local data network need a data link destination address for a message. Nodes associated with incoming or two way data links have access to stored translation data to indicate the node associated with any data link destination address. When a packet is received, a logical channel and, if desired, a protocol channel, is set up from the incoming data link node to the outgoing data link node, to transmit the data; this process is the same as that described above for the transmission of other packets between nodes.

For incoming packets to a first node of the present system, a data link destination address is examined by a data reception process in the I/O controller, such as 113, associated with the incoming packet data link. The incoming packet can then be routed, inside another packet of the format used for transmitting packets within the local data network, to a second node connected to the outgoing data link of the destination of the incoming data packet. This second node will be initialized to have a receive port, associated with the outgoing data link, to route the packet to appropriate storage, either within an I/O controller, or some shared node storage such as unit 112, prior to transmission to the destination. A data transmission process in the second node then controls the transmission of the packet, stripped of its local data network header and check data (fields 201, 202, 203, 204, 206 of FIG. 3), to the destination via the outgoing data link.

Note that while the present system uses a content addressable memory, the fundamental need is the storage in memory or circuitry of the identification of destination addresses associated with packets to be received by a given node. The identifications can be stored directly as multi-bit addresses, or as indirect indications such as addresses with selected bits masked, to be compared with the destination address of any packet on the data network medium. Storing each address is convenient since position on a list can be used as an address identification to obtain the desired storage address (receive buffer) for a packet, but any other means of generating the storage address based on a specific destination address, such as a tabular translation arrangement, would also serve the purpose. Alternatively, the content addressable memory can be used directly to translate from a packet destination address to the desired storage address, by storing each desired address directly in association with the corresponding destination address instead of storing the receive port number as in the present implementation.

In this system, the level of the protocol, retained throughout a series of packets and transmitted with each packet, determines the type of check and acknowledgment. In other applications, it may be desirable to specify whether an acknowledgment is required and other details of the type of check to be performed as part of the header to each packet. For example, if a message consists of several packets, it may be convenient to request an acknowledgment only for the last packet but to allow negative acknowledgment packets to be generated for any intermediate packets. Alternatively, data concerning acknowledgment requests could be initialized in a receiving node when a receive port or receive protocol channel is set up and not transmitted with each packet. Flexible types of acknowledgment requests are readily implementable in this type of system.

In this system, data concerning acknowledgments is sent with each packet. It is also possible to associate acknowledgment request data in each node with each receive port. The messages requesting initialization of a port and/or protocol channel would pass the acknowledgment requirement data which would then be initialized in the control blocks of a port and protocol channel.

It is to be understood that the above-described embodiment is merely illustrative of the principles of this invention. Other arrangements may be devised by those skilled in the art without departing from the spirit and scope of the invention.

What is claimed is:

1. A local data network, comprising:

a transmission medium;

a first node connected to said medium, for generating and transmitting on said medium data packet signals representing a data packet, said data packet signals comprising acknowledgment request signals representing acknowledgment request data; and a second node connected to said medium, comprising:

receive circuit interface means connected to said medium for receiving said data packet signals;

buffer storage means, connected to said receive circuit interface means, for storing said data packet signals;

first means connected to said buffer storage means and responsive to the contents of said buffer storage means representing said acknowledgment request data for selectively assembling an acknowledgment packet; and second means connected to said medium for generating acknowledgment packet signals representing said acknowledgment packet assmebled by said first means for transmission over said medium;

in which said first means comprises program-controlled interface processor means responsive to contents of said buffer storage means for assembling said acknowledgment packets;

in which said second node comprises means for storing a master indicator having a positive and negative state, wherein said second node is responsive to the contents of the buffer storage means in said second node to generate said acknowledgment packet signals if said master indicator has a positive state.

2. A local data network, comprising:

a transmission medium;

a first node connected to said medium, for generating and transmitting on said medium data packet signals representing a data packet, said data packet signals comprising acknowledgment request signals representing acknowledgment request data; and a second node connected to said medium, comprising:

receive circuit interface means connected to said medium for receiving said data packet signals;

buffer storage means, connected to said receive circuit interface means, for storing said data packet signals;

first means connected to said buffer storage means and responsive in the contents of said buffer storage means representing said acknowledgment request data for selectively assembling an acknowledgment packet; and second means connected to said medium for generating acknowledgment packet signals representing said acknowledgment packet assembled by said first means for transmission over said medium;

in which said first means comprises program-controlled interface processor means responsive to contents of said buffer storage means for assembling said acknowledgment packets;

wherein said acknowledgment request data comprises data having a first set of values for requesting that said acknowledgment packet be transmitted and a second set of values for requesting that said acknowledgment packet not be transmitted.

3. In a local data network comprising a transmission medium and a plurality of nodes connected to said medium, each of said nodes comprising buffer storage means, a method of transmitting an acknowledgment packet over said medium, comprising the steps of:

transmitting from a first of said nodes data packet signals representing a data packet, said data packet signals comprising acknowledgment request signals representing acknowledgment request data;

receiving and storing said data signals comprising said acknowledgment request signals in the buffer storage means of a second of said nodes; and selectively generating and transmitting acknowledgment packet signals representing an acknowledgment packet from said second node over said data network medium in response to said acknowledgment request signals stored in said buffer storage means; and storing initialization data in said second node for making said second node responsive to selected values of said acknowledgment request data signals stored in said buffer storage means to selectively generate and transmit said acknowledgment packet signals on said transmission medium.

4. The invention of claim 3 further comprising the step of:

allocating and initializing data blocks for a transmit port and a transmit protocol channel in said first node;

wherein said step of storing initializing data comprises the steps of allocating and initializing data blocks for a receive port and receive protocol channel in said second node; and wherein said acknowledgment packets are transmitted over said medium from said receive protocol channel to said transmit protocol channel.

5. The invention of claim 4 in which said transmit protocol channel has an associated transmit protocol channel number and wherein said acknowledgment request data comprises said transmit protocol channel number.

6. In a local data network comprising a transmission medium and a plurality of nodes connected to said medium, each of said nodes comprising buffer storage means, a method of transmitting an acknowledgment packet over said medium, comprising the steps of:

transmitting from a first of said nodes data packet signals representing a data packet, said data packet signals comprising acknowledgment request signals representing acknowledgment request data;

receiving and storing said data packet signals comprising said acknowledgment request signals in the buffer storage means of a second of said nodes; and selectively generating and transmitting acknowledgment packet signals representing an acknowledgment packet from said second node over said data network medium in response to said acknowledgment request signals stored in said buffer storage means;

wherein said acknowledgment request data comprises data having a first set of values for requesting that said acknowledgment packet be transmitted and a second set of values for requesting that said acknowledgment packet not be transmitted.

7. A local network comprising:

a transmission medium;

first node means for transmitting on said medium signals representing a data packet and comprising acknowledgment request data signals; and second node means comprising:

buffer storage means for storing said data packet signals received from said medium;

means responsive to acknowledgment request data signals stored in said buffer storage means for selectively assembling an acknowledgment packet; and means responsive to the assembled acknowledgment packet for transmitting acknowledgment packet signals representing said assembled acknowledgment packet over said medium;

wherein said assembling means comprises program-controlled means responsive to said stored acknowledgment request data signals for assembling said acknowledgment packet; and wherein said second node means further comprises means for storing control signals having a positive and negative state, wherein said assembling means is responsive to said stored acknowledgment request data signals to assemble said acknowledgment packet if said control signals have a positive state.

8. In a local data network comprising a transmission medium and a plurality of nodes connected to said medium, each of said nodes comprising buffer storage means, a method of transmitting an acknowledgment packet over said medium comprising the steps of:

transmitting signals representing a data packet from a first node, said signals comprising signals representing acknowledgment request data;

storing said signals representing a data packet in the buffer storage means of a second node;

selectively transmitting signals representing an acknowledgment packet from said second node over said medium in response to said stored signals representing acknowledgment request data; and storing initialization data in said second node for making said second node responsive, to selected values of said stored signals representing acknowledgment request data, selectively to transmit said acknowledgment packet signals on said transmission medium.

* * * * *

UNITED STATES PATENT AND TRADEMARK OFFICE

CERTIFICATE OF CORRECTION

PATENT NO. : 4,654,654

DATED : March 31, 1987

INVENTOR(S) : Thomas T. Butler, Wayne V. Lindquist, Priscilla M. Lu

It is certified that error appears in the above-identified patent and that said Letters Patent is hereby corrected as shown below:

Column 26, line 47, change "assmebled" to --assembled--.

Column 27, line 7, after "responsive" change "in" to --to--.

Column 27, line 33, after "data" insert --packet--.

Column 28, line 21, after "local" insert --data--.

Signed and Sealed this

Twenty-fifth Day of August, 1987

*Attest:*

DONALD J. QUIGG

*Attesting Officer* *Commissioner of Patents and Trademarks*